United States Patent
Hatstat

(10) Patent No.: US 10,480,928 B2
(45) Date of Patent: Nov. 19, 2019

(54) PARALLAX-BASED DETERMINATION OF DIMENSION(S) RELATED TO AN OBJECT

(71) Applicant: DATALOGIC AUTOMATION, INC., Telford, PA (US)

(72) Inventor: Andrew Hatstat, Lansdale, PA (US)

(73) Assignee: Datalogic USA, Inc., Eugene, OR (US)

(*) Notice: Subject to any disclaimer, the term of this patent is extended or adjusted under 35 U.S.C. 154(b) by 621 days.

(21) Appl. No.: 15/244,831

(22) Filed: Aug. 23, 2016

(65) Prior Publication Data

US 2018/0058839 A1   Mar. 1, 2018

(51) Int. Cl.
| | |
|---|---|
| G01B 11/00 | (2006.01) |
| G01B 11/02 | (2006.01) |
| G01C 3/08 | (2006.01) |
| G01B 11/24 | (2006.01) |
| G01B 11/25 | (2006.01) |

(52) U.S. Cl.
CPC .............. *G01B 11/00* (2013.01); *G01B 11/02* (2013.01); *G01B 11/24* (2013.01); *G01B 11/25* (2013.01); *G01C 3/08* (2013.01)

(58) Field of Classification Search
CPC ......... G01B 11/24; G01B 11/25; G01B 11/00; G01B 11/02; G01C 3/08
See application file for complete search history.

(56) References Cited

U.S. PATENT DOCUMENTS

| | | | |
|---|---|---|---|
| 3,796,492 A | 3/1974 | Cullen et al. | |
| 3,918,816 A | 11/1975 | Foster et al. | |
| 4,737,032 A * | 4/1988 | Addleman | ......... G05B 19/4207 356/606 |
| 4,949,843 A | 8/1990 | Stokes | |
| 6,028,672 A | 2/2000 | Geng | |
| 8,483,444 B2 | 7/2013 | Aikawa et al. | |
| 2001/0001578 A1 | 5/2001 | Blais | |
| 2003/0002051 A1 | 1/2003 | Cohn | |

OTHER PUBLICATIONS

Extended European Search Report, dated Dec. 14, 2017, for European Application No. 17187195.7-1568, 7 pages.

* cited by examiner

*Primary Examiner* — Hina F Ayub
*Assistant Examiner* — Amanda Merlino
(74) *Attorney, Agent, or Firm* — Cozen O'Connor

(57) ABSTRACT

First and second reflective portions are angled (e.g., included angle of approximately 178 degrees) with respect to one another to produce a parallax image of a structured light pattern (e.g., linear pattern) projected onto a surface of an object to determine at least one dimension (e.g., range, height, width) associated with the object. The reflections may be detected by a light sensor (e.g., a single linear image sensor) as dual "differential" parallax images of the structured light pattern, which advantageously inherently causes errors to cancel out.

38 Claims, 9 Drawing Sheets
(2 of 9 Drawing Sheet(s) Filed in Color)

PARALLAX-BASED DETERMINATION OF DIMENSION(S) RELATED TO AN OBJECT

TECHNICAL FIELD

The present disclosure generally relates to optical systems that can determine one or more dimensions associated with an object in an environment.

BACKGROUND

Description of the Related Art

There are many types of optics-based technologies for determining range and/or dimensions of objects in an environment, for instance depth camera technologies, including, for example, time of flight, passive stereo, active stereo, and structured light. Such technologies enable, for instance, a depth camera system to determine depth values for a scene. For example, each depth value may be representative of a distance or range from the depth camera system to a particular object contained within the environment.

Systems that perform time of flight techniques rapidly pulse a light source and determine a delay between emission of the light and reception of light reflected from various locations in the scene. A system that performs time of flight techniques typically requires a complex, custom imaging sensor.

Passive stereo cameras typically rely on texture (e.g., printing) on a surface of the object being scanned. However, in transport and logistics applications there is no guarantee that an object (e.g., a blank cardboard box) will bear texture. Active stereo cameras (e.g., Microsoft Kinect Version 1), project a light pattern (i.e., structured light) on the surface of the object to be scanned, to ensure the presence of texture.

Systems that employ stereo techniques match corresponding image points respectively seen by plural cameras. Such correspondence detection requires significant processing, particularly when applied to image regions that are homogenous in color or intensity. Thus, in order to perform well with respect to untextured scenes, depth camera systems often augment stereo techniques by using a projected light pattern, also known as active stereo. Rectifying the images can simplify processing by allowing the correlation to occur along a linear shift called the epipolar line. However, stereo techniques still include a significant processing time and cost.

Structured light systems typically include a camera and a projector. The projector projects a pattern of light (i.e., structured light). The system compares the locations of certain features of the pattern in a captured image with locations of the features in a reference image to determine disparities. Such disparities can be used to determine depth at each location. However, for complex patterns, detection of pattern features can be computationally expensive, similar to stereo techniques. Other structured light techniques exist, as well. For example, temporal structured light methods use a sequence of light patterns emitted by a programmable projector to provide accurate range maps. However, temporal techniques typically require the scene to remain stationary.

There are several products used in transportation and logistics applications, each associated with some set of problems. For example, Datalogic's DM3610 dimensioner implements a scanned laser Time of Flight method. This approach suffers due to various moving parts, high noise on black objects, and large expensive optics. Datalogic's DM3500 dimensioner implements a scanned laser spot triangulation approach. This approach also suffers due to moving parts and large optics. Unlike the DM3610, noise from black objects is less of a problem for the DM3500, however the DM3500 still suffers from noise due to temperature and mechanical sensitivity associated with the parallax angle. The system described in U.S. Pat. No. 4,929,843 by Thomas A. Chmielewski Jr., et al uses a parallax approach, with a single projected laser line and two-dimensional (2D) imager. Other devices employ either a linear or 2D structured light parallax approach. The Chmielewski approach is simple, and does not require moving parts or expensive optics. However, systems such as this can suffer from sensitivity to variations in reflectivity on a surface of the scanned objects, for example due to text or other printing, and/or tape or film on an object (e.g., cardboard box), which can distort the location of the reflected light pattern. The Chmielewski system can suffer from sensitivity to small changes in the parallax angle caused by temperature changes or vibration. Most parallax approaches further suffer from issues with shadowing.

The object may bear indicia (e.g., human and/or machine-readable symbols, markings or images). Such indicia vary the reflectance of the object, and thus interfere with the ability of conventional dimensioners to correctly or accurately determine dimensions of an object.

BRIEF SUMMARY

The above noted techniques generally require a trade-off between lateral resolution, range resolution, motion tolerance, processing cost, and/or hardware complexity to achieve their respective results.

Various implementations of the structures and methods described herein can be used to measure a volume of objects moving on a conveyor belt.

An optical system implements a dual "differential" parallax approach, reducing or even eliminating error or noise. For example, a linear dimensioner (i.e., not 2D) employs a dual "differential" parallax approach. This approach realizes the simplicity and low cost typically associated with a linear parallax-based system (e.g., the Chmielewski system), with the robustness typically associated with an active stereo-based system, to minimize errors caused by varying reflectance (i.e., object texture) across a surface of objects to be scanned, and errors due to vibration of the laser relative to the receiving optics (i.e., parallax angle error). The approach described herein may also advantageously mitigate the effects of up and downstream shadowing. Thus, the approach described herein advantageously reduces errors experienced by a single laser parallax camera.

A system may be summarized as including: a light source (e.g., laser, LEDs) operable to emit light (e.g., a laser beam) outward into an environment; a first reflective surface and a second reflective surface, the first and the second reflective surfaces positioned with respect to the laser to concurrently receive light returned from an object in the environment as a structured light pattern (e.g., laser line, sequence of spots or dots, multiple lines, linear pattern), the second reflective surface oriented at a non-zero angle with respect to the first reflective surface; a light sensor (e.g., two-dimensional image sensor) positioned to concurrently detect, in parallax, light reflected from the object in the environment via both the first and the second reflective surfaces, respectively as a first instance of the structured light pattern (e.g., laser line) reflected from the first reflective surface and a second instance of the structured light pattern (e.g., laser line)

reflected from the second reflective surface; and at least one processor communicatively coupled to the light sensor, and which in operation correlates a relative position of the first and the second instances of the structured light pattern (e.g., laser line) detected by the light sensor and determines at least one dimension related to the object based at least in part on the correlation of the relative positions of the first and the second instances of the structured light pattern (e.g., laser line) detected by the light sensor.

The non-zero angle between the first and the second reflective surfaces may be an obtuse angle that is less than 180 degrees. The first reflective surface may be a planar surface that has a respective inner edge and the second reflective surface may be a planar surface that has a respective inner edge, the second reflective surface spaced from the first reflective surface with a gap between the respective inner edges of the first and the second reflective surfaces, and the light (e.g., laser beam) passes through the gap outward into the environment. The first reflective surface may be a portion of a first mirror and the second reflective surface may be a portion of a second mirror, the second mirror separate and distinct from the first mirror. The first reflective surface may be a first portion of a mirror and the second reflective surface may be a second portion of the second mirror. The light sensor may be a single two-dimensional (2D) light sensor, and the system may further include: at least one mirror positioned with respect to the light source (e.g., laser) and operable to at least one of rotate or pivot to produce the structured light pattern (e.g., laser line). The light sensor may be a 2D image sensor, and the system may further include: a conveyor that carries the object past a field of view of the image sensor via the first and the second reflective surfaces. The at least one dimension related to the object determined by the at least one processor may include a distance to a portion or a surface (e.g., closest portion or closest surface) of the object. The at least one dimension related to the object determined by the at least one processor may include a height of the object. The at least one dimension related to the object determined by the at least one processor may include a width of the object and/or a length of the object. To correlate a relative position of the first and the second instances of the structured light pattern (e.g., laser line) detected by the light sensor, the at least one processor: for the first instance of the structured light pattern, may determine at each of a plurality of positions along the first instance of the structured light pattern a respective centroid for the first instance of the structured light pattern at the respective position; and for the second instance of the structured light pattern, may determine at each of a plurality of positions along the second instance of structured light pattern a respective centroid for the second instance of the structured light pattern at the respective position. To determine at least one dimension related to the object based at least in part on the correlation of the relative positions of the first and the second instances of the structured light pattern (e.g., laser line, scan line, linear pattern), the at least one processor: may determine a range to the object based on the determined centroids along the first and the second instances of the structured light pattern. The at least one processor may determine the range to the object based at least in part on the determined centroids for each of the positions along the first and the second instances of the structured light pattern (e.g., laser line). The at least one processor may determine the range to the object further based on a set of calibration information. The at least one processor may average the results of the determined range to the object based on the determined centroids for each of the positions along the first and the second instances of the structured light pattern (e.g., laser line). To determine at least one dimension related to the object based at least in part on the correlation of the relative positions of the first and the second instances of the structured light pattern, the at least one processor: may determine a height of the object based on the determined range and a distance to a surface on which the object is supported. To determine at least one dimension related to the object based at least in part on the correlation of the relative positions of the first and the second instances of the structured light pattern, the at least one processor: may determine a width of the object and/or length of the object based on the determined centroids. The at least one processor may determine a width of the object and/or length of the object based at least in part on the determined centroids for each of the positions along the first and the second instances of the structured light pattern (e.g., laser line). The at least one processor may average the results of the determined width and/or length of the object based on the determined centroids for each of the positions along the first and the second instances of the structured light pattern. The at least one processor may determine the width of the object further based on a set of calibration information.

A method may be summarized as including: emitting a light beam by a light source (e.g., laser, LEDs), for example to produce a structured light pattern (e.g., laser line, scan line, line of dots or spots, multiple lines); reflecting light returned from an object in an environment by a first reflective surface; concurrently reflecting the light returned from the object in the environment by a second reflective surface, the second reflective surface oriented at a non-zero angle with respect to the first reflective surface; detecting by a light sensor the light reflected from the object in the environment via both the first and the second reflective surfaces in parallax, respectively as a first instance of a structured light pattern (e.g., laser line) reflected from the first reflective surface and a second instance of the structured light pattern (e.g., laser line) reflected from the second reflective surface; and determining by at least one processor communicatively coupled to the light sensor, at least one dimension related to the object based at least in part on a correlation of a relative position of the first and the second instances of the structured light pattern (e.g., laser line) detected by the light sensor.

Emitting a light beam by a light source, outward into an environment may include passing the light beam (e.g., laser beam) through a gap between respective inner edges of the first and the second reflective surfaces. The method may further include: rotating or pivoting at least one mirror to reflect light emitted by the light source (e.g., laser, LEDs) as the structured light pattern (e.g., laser line, scan line). Alternatively or additionally, the method may include directing the light to one or more refractive or diffractive optics to produce the structured light pattern. The light sensor may be a two-dimensional (2D) image sensor, and the method may further include: transporting the object by a conveyor past a field of view of the two-dimensional image sensor. Determining at least one dimension related to the object based at least in part on a correlation of a relative position of the first and the second instances of the structured light pattern (e.g., laser line) detected by the light sensor may include determining a distance to a point, portion or surface (e.g., closest point, portion or surface) of the object by the at least one processor. Determining at least one dimension related to the object based at least in part on a correlation of a relative position of the first and the second instances of the structured light pattern (e.g., laser line) detected by the light sensor may include determining a height of the object by the at least one processor. Determining at least one dimension related to the object based at least in part on a correlation of a relative position of the first and the second instances of the structured light pattern (e.g., laser line) detected by the light sensor may include determining at least one of a width of the object and/or a length of the object by the at least one processor. Determining at least one dimension related to the object based at least in part on a correlation of a relative position of the first and the second instances of the structured light pattern (e.g., laser line) detected by the light sensor may include: for the first instance of the structured light pattern (e.g., laser line), determining at each of a plurality of positions along the first instance of the structured light pattern (e.g., laser line) a respective centroid for the first instance of the structured light pattern (e.g., laser line) at the respective position; and for the second instance of the structured light pattern (e.g., laser line), determining at each of a plurality of positions along the second instance of the structured light pattern (e.g., laser line) a respective centroid for the second instance of the structured light pattern (e.g., laser line) at the respective position. Determining at least one dimension related to the object based at least in part on the correlation of the relative positions of the first and the second instances of the structured light pattern (e.g., laser line) may include: determining a range to the object based on the determined centroids along the first and the second instances of the structured light pattern (e.g., laser line). Determining the range to the object based at least in part on the determined centroids may include determining the range for each of the positions along the first and the second instances of the structured light pattern (e.g., laser line). Determining the range to the object based at least in part on the determined centroids may include determining the range to the object further based on a set of calibration information. Determining at least one dimension related to the object based at least in part on a correlation of a relative position of the first and the second instances of the structured light pattern (e.g., laser line) detected by the light sensor may further include averaging the results of the determined range to the object based on the determined centroids for each of the positions along the first and the second instances of the structured light pattern (e.g., laser line). Determining at least one dimension related to the object based at least in part on the correlation of the relative positions of the first and the second instances of the structured light pattern (e.g., laser line) may include: determining a height of the object based on the determined range and a distance to a surface on which the object is supported. Determining at least one dimension related to the object based at least in part on the correlation of the relative positions of the first and the second instances of the structured light pattern (e.g., laser line) may include: determining at least one of a width of the object and/or a length of the object based on the determined centroids. Determining a width of the object based at least in part on the determined centroids may include, for each of the positions along the first and the second instances of the structured light pattern (e.g., laser line), determining the width of the object and/or the length of the object based at least in part on respective ones of the determined centroids. Determining at least one dimension related to the object based at least in part on a correlation of a relative position of the first and the second instances of the structured light pattern (e.g., laser line) detected by the light sensor further may include averaging the results of the determined width of the object based on the determined centroids for each of the positions along the first and the second instances of the structured light pattern (e.g., laser line). Determining a width of the object and/or a length of the object based at least in part on the determined centroids may include determining the width of the object or the length of the object further based on a set of calibration information.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, unrecited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not interpret the scope or meaning of the embodiments.

Figure 1:
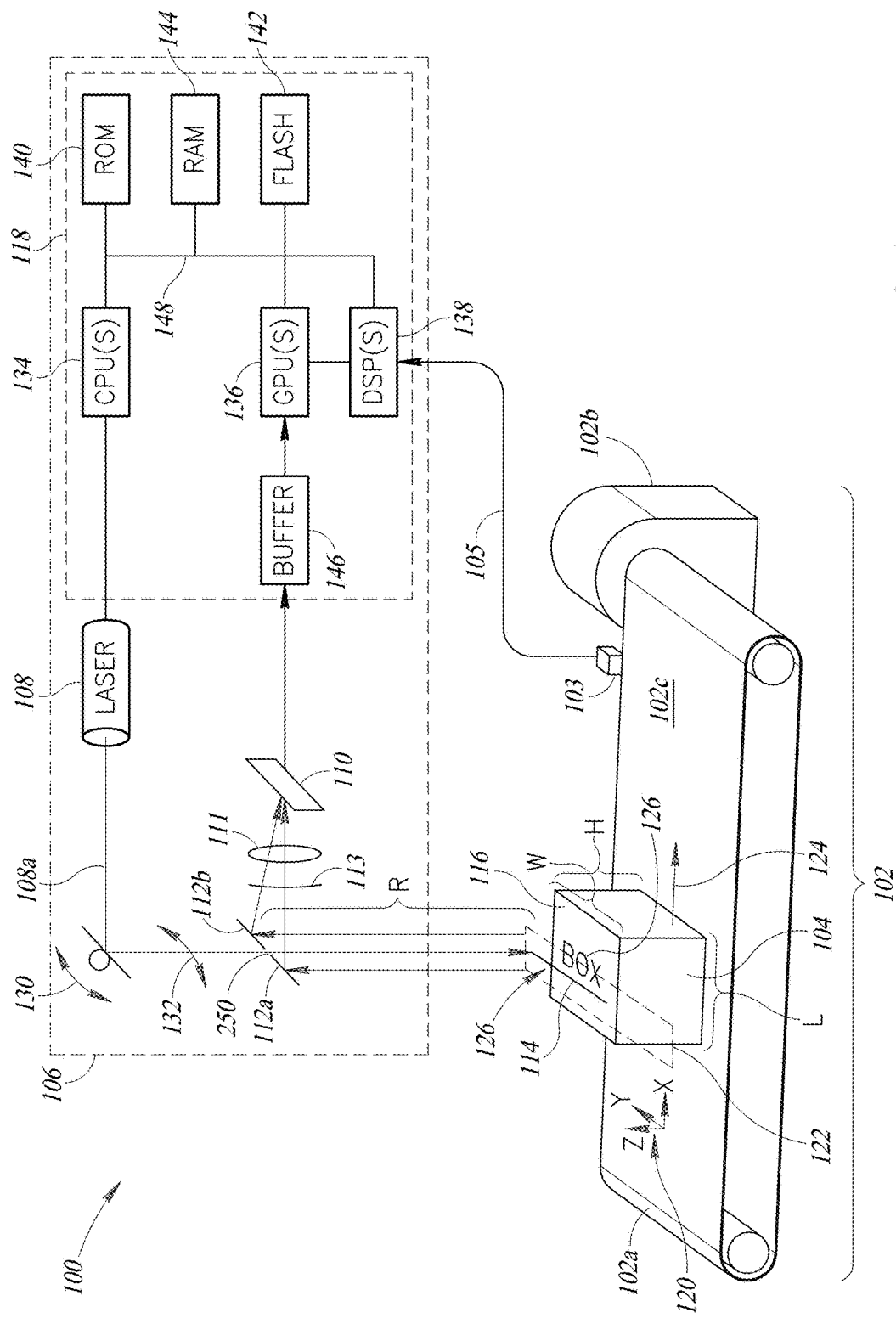
FIG. 1 is a schematic diagram of an environment that includes a conveyor, an object transported by the conveyor, and a system that employs a light source to produce a structured light pattern, a light sensor, a pair of angled reflectors that produce dual "differential" parallax images of the structured light pattern on the object, and which determines at least one dimension (e.g., range, height, width) associated with the object, according to at least one illustrated implementation.

FIG. 1 shows an environment 100 that includes a conveyor 102, an object 104 transported by the conveyor 102, and a system 106 that employs a light source (e.g., laser, LEDs) 108, a light sensor 110, and a pair of angled reflective portions or reflectors 112a, 112b that produce dual "differential" parallax images of a structured light pattern (e.g., laser line, scan line, line of dots or spots, multiple lines) 114 projected on a surface 116 of the object 104 which are detected by the light sensor 110, and processor-based circuitry (i.e., processor subsystem) 118 which determines at least one dimension (e.g., range R, height H, width W, length L) associated with the object 104, according to at least one illustrated embodiment.

The environment 100 can take the form of any of a variety of spaces. A coordinate system 120 with X-axis, Y-axis and Z-axis is illustrated to facilitate description of the operation of the system 106 in the environment 100.

The conveyor 102 can take any of a variety of forms, including for example, a conveyor belt 102a or roller conveyor, etc. The conveyor 102 includes a suitable motor (e.g., electric motor) 102b coupled to drive the conveyor belt 102a, and hence objects 104 carried by the conveyor 102, past a field of view (represented by broken line box 122) of the light sensor. As illustrated by arrow 124, the conveyor 102 transports the object 104 in a direction along the X-axis with respect to the field of view 122. In some implementations, the conveyor 102 can operate at a relatively high speed, for example approximately 3.5 meters/second. A top surface 102c of the conveyor 102 may be positioned at a fixed and/or known distance from the pair of angled reflective portions or reflectors 112a, 112b. A conveyor 102 is useful for high speed processing, although a conveyor is not essential, and in some implementations the object 104 may be positioned on a stationary surface. The conveyor 102 typically includes a sensor to detect position and/or speed which is communicatively coupled (arrow 105) to provide information representative of position and/or speed to the processor-based circuitry 118. For example, the conveyor can include an encoder, tachometer, or other belt speed measurement device 103. Information (e.g., the position of the conveyor each time an image is taken and processed, speed) generated from the sensor 103 is used by the processor-based circuitry 118 to determine the dimensions of the object along the direction of travel 124 of the conveyor 102 (e.g., used to determine length of the object 104).

The object 104 can take any of a large variety of forms. Typically, the object 104 will take the form of a parcel, box, can, or other packaging, although is not limited to such. The object 104 may be characterized by a set of dimensions, for example a height H along the Z-axis, a width W along the Y-axis, and a length L along the X-axis. While illustrated as aligned, width and/or length are not necessarily aligned with the X-axis and Y-axis. For example, a long skinny package may be rotated at, for example, 45 degrees to a length of a conveyor belt. Where the top surface 102c of the conveyor 102 is positioned at a fixed and/or known distance from the pair of angled reflective portions or reflectors 112a, 112b, the height H of the object 104 can be determined as the difference of a distance of the top surface 102c of the conveyor 102 from the pair of angled reflective portions or reflectors 112a, 112b and the range (i.e., distance of the surface 116 of the object 104 from the pair of angled reflective portions or reflectors 112a, 112b).

The object 104 may bear indicia (e.g., human and/or machine-readable symbols, markings or images) 126. Such indicia 126 typically interfere with the ability of conventional dimensioners to correctly or accurately determine dimensions of an object 104.

The light source 108 can take any of a variety of forms operable to produce a structure light pattern (e.g., laser line, scan line, line of dots or spots, multiple lines). For example the light source can take the form of a laser 108 (e.g., laser diode) operable to produce a coherent beam of laser light (i.e., laser beam) 108a. Alternatively, one or more light emitting diodes (LEDs) may emit one or more light beams. The light source 108 (e.g., laser, LEDs) can emit a light beam (e.g., laser spot) toward one or more refractive optics (e.g., Powell lens or cylindrical lens) or diffractive optics (e.g., diffractive lens) to create the structured light pattern 114. Alternatively, one or more mirrors 128 (e.g., flat mirrors, polygonal mirrors) or other optics are positioned to reflect the light beam 108a, and are driven to rotate or pivot as indicated by arrow 130 to rotate or pivot the light beam 108a as indicated by arrow 132 to produce the structured light pattern (e.g., laser line, scan line) 114 which impinges on the surface 116 (e.g., top) of the object 104 when the object 104 is in the field of view 122 of the light sensor 110.

The light sensor 110 may take a variety of forms, but advantageously takes the form of a single two-dimensional (2D) image sensor positioned and oriented to concurrently detect reflections from both a first reflective portion 112a and a second reflective portion 112b, which are angled with respect to one another to create a parallax image on the linear image sensor 110. One or more lenses 111 (one shown) are typically arranged along an input optical axis to focus the returning light on the image sensor 110. Additionally or alternatively, one or more bandpass filters 113 (one shown) may optionally be employed along the input optical axis. The bandpass filter 113 passes light of the same wavelength (color) as the outgoing light and suppresses other wavelengths of light, to facilitate identification of the structured light pattern in a captured image. Where the conveyor 102 operates at a relatively high speed, for example 3.5 meters/second, the light sensor 110 should have a relative high frame rate, for example approximately 500 to approximately 1000 frames/second.

The processor-based circuitry 118 may take any of a large variety of forms, typically including one or more processors, for example one or more microprocessors (CPUs) 134, microcontrollers, graphical processing units (GPUs) 136, digital signal processors (DSPs) 138, application-specific integrated circuits (ASICs), programmable gate arrays (PGAs), programmable logic controllers (PLCs), and/or other integrated and/or discrete logic hardware. The processor-based circuitry 118 may include one or more nontransitory computer- or processor-readable media, for example, one or more non-volatile memories, for instance read-only memory (ROM) 140, electronically erasable programmable ROM (EEPROM), flash memory 142, and/or one or more volatile memories, for instance random access memory (RAM) 144. The processor-based circuitry 118 may optionally include one or more image buffers 146, coupled to buffer images captured by the light sensor 110 for processing. While not specifically illustrated, the processor-based circuitry 118 may include one or more spinning media drives and storage, for example a magnetic hard disk drive (HDD) and/or optical disk drive (CD-ROM). The various components of the processor-based circuitry 118 may be communicatively coupled via one or more communications channels or buses 148, for example a power bus, a communications bus, and instructions bus, etc.

As explained herein, the processor-based circuitry 118 may determine one or more dimensions associated with the object 104 from the dual "differential" parallax images of a laser line 114 on the object 104 as detected by the light sensor 110. Those dimensions can include any one or more of: distance or range R to the object 104 measured along the Z-axis, height H of the object 104 measured for example along the Z-axis, width W of the object measured for example along the Y-axis, and/or length L of the object 104 measured for example along the X-axis. The processor-based circuitry 118 may advantageously accurately determine the dimension(s) even if the object 104 bears printing, indicia, or anything else that would create inconsistency in reflectance over the surface 116 of the object 104.

Figure 2:
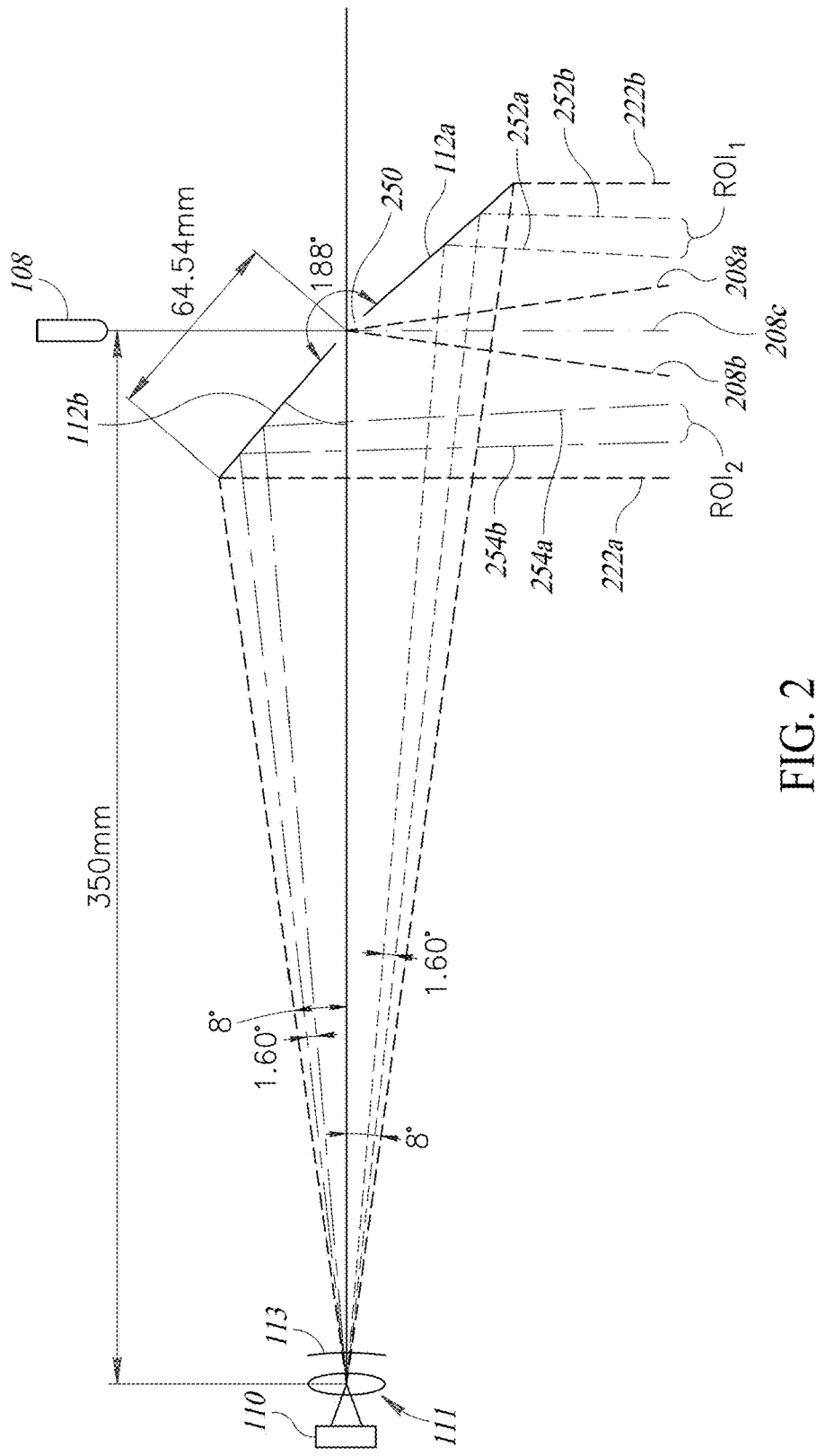
FIG. 2 is a schematic diagram illustrating a relative positioning and orientation of a pair of angled reflectors and an image sensor of the system of FIG. 1 showing representative ray traces, according to at least one illustrated implementation.

FIG. 2 shows a relative positioning and orientation of the pair of angled reflective portions or reflectors 112a, 112b, light source 108, and image sensor 110 of the system of FIG. 1, including representative ray traces, according to at least one illustrated embodiment. In FIG. 2, the X-axis extends horizontally across the plane of the drawing sheet, the Y-axis extends into the plane of the drawing sheet, and the Z-axis extends vertically across the plane of the drawing sheet.

As illustrated, the first angled reflective portion or reflector 112a and the second reflective portion or reflector 112b are positioned and angled to reflect light to the image sensor 110 from an external environment. For example, the second reflective portion or reflector 112b may be oriented at an acute angle with respect to a principal optical axis (e.g., perpendicular to a light sensitive surface) of the light sensor 110, for instance an included angle of approximately 47 degrees. The first angled reflective portion or reflector 112a and the second reflective portion or reflector 112b are angled with respect to one another, to advantageously provide a parallax effect. For example, the first and the second reflective portions or reflectors 112a, 112b may have an obtuse included angle therebetween, for instance an included angle of approximately 172 degrees therebetween. The first angled reflective portion or reflector 112a and the second reflective portion or reflector 112b may, for example, each have planar reflective faces. The first angled reflective portion or reflector 112a and the second reflective portion or reflector 112b may be two separate and distinct reflectors. Alternatively, the first angled reflective portion or reflector 112a and the second reflective portion or reflector 112b may be portions of a single, integral single-piece construction reflector or mirror. The first angled reflective portion or reflector 112a and the second reflective portion or reflector 112b may include a gap 250 therebetween. The light source 108 may be positioned and oriented to transmit the light beam 108a through the gap 250, either via one or more mirrors or other optics, or directly without the aid of mirrors or optics.

As illustrated in FIG. 2, the laser 108 generates a structured light pattern (e.g., laser scan line or plane) indicated by 208c. As indicated by rays 252a, 252b, the first angled reflective portion or reflector 112a directs light from a first region of interest $ROI_1$ to the light sensor 110. As indicated by rays 254a, 254b, the second angled reflective portion or reflector 112b directs light from a second region of interest $ROI_2$ to the light sensor 110. Rays 222a, 222b indicate an extent of the field of view 122 (FIG. 1) of the light sensor 110 provided via the first and the second angled reflective portions or reflectors 112a, 112b. Rays 208a and 208b are the extents of the field of view of the image sensor 110 for each mirror, which are the opposite field of view extent of rays 222a and 222b.

Exemplary principal values for the system illustrated in FIGS. 1 and 2 are set out in Table 1, below.

TABLE 1

| Design Feature | Value |
| --- | --- |
| Mirror Kink Angle | 8 degrees |
| Sensor | 5MP CMOS |
| Lens | 25 mm F/8 |
| Mirror Dimensions | 150 mm wide × 75 mm tall |
| Laser Line Angle | Perpendicular to Belt |
| Mounting Height | 1500 mm (kink to belt) |
| Camera to Mirror Kink | 350 mm |
| ROI Height | 200 Rows per ROI |
| Approximate ROI Row Location | 180-380, 1676-1876 |
| Single Ended Parallax Angle | 1.45-3.05 degrees |
| Differential Parallax Angle | 2.90-6.10 degrees |
| Max Box Height | 930 mm |

Figure 3:
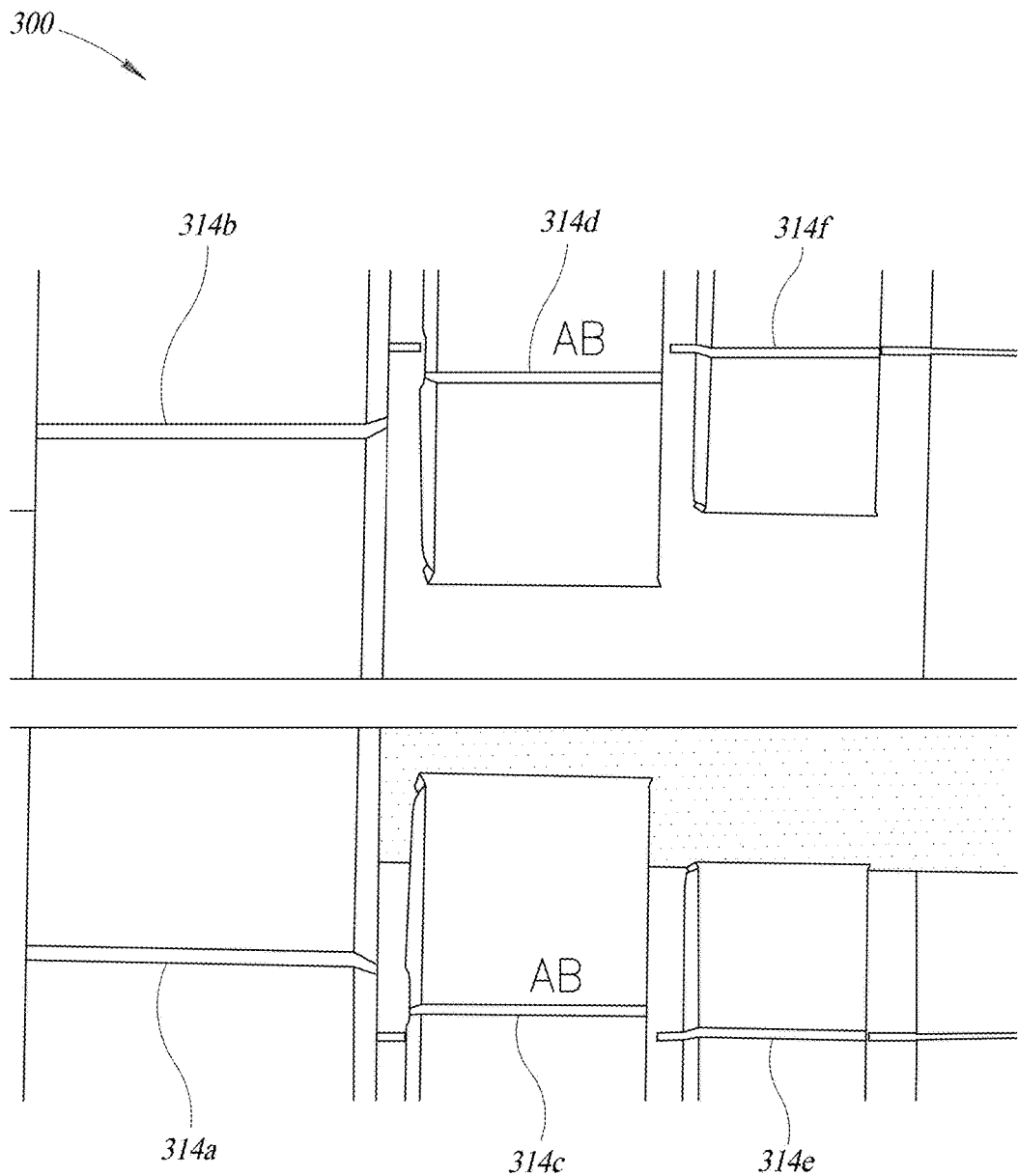
FIG. 3 is an image of laser scan lines returned from an object at three respective distances or ranges, according to at least one illustrated embodiment, with the light bandpass filter removed and exposure time increased to facilitate human viewing.

FIG. 3 is an image 300 of three pairs of structure light patterns as lines 314a, 314b; 314c, 314d; 314e, 314f (collectively 314) of light, returned from an object at three respective distances or ranges R, according to at least one illustrated embodiment. The lines 314 were captured with a light bandpass filter (e.g., red filter) removed and exposure time increased to facilitate human perception of the lines.

Notably, a first pair of lines 314a, 314b are produced by reflection from the first and the second angled reflective portions or reflectors 112a, 112b, respectively, and are spaced relatively close together as compared to a second pair of lines 314c, 314d. Likewise, the second pair of lines 314c, 314d are produced by reflection from the first and the second angled reflective portions or reflectors 112a, 112b, respectively, and are spaced relatively close together as compared to a third pair of lines 314e, 314f. Likewise, the third pair of lines 314e, 314f are produced by reflection from the first and the second angled reflective portions or reflectors 112a, 112b, respectively. The spacing between the lines 314 in each pair is indicative of a range R of the object from the system (e.g., distance between a portion or surface of the object and the gap 250 (FIG. 2) between the first and the second angled reflective portions or reflectors 112a, 112b). The processor-based circuitry 118 may, for example, identify a single point or set of points in a three-dimensional (3D) point cloud.

Figure 4:
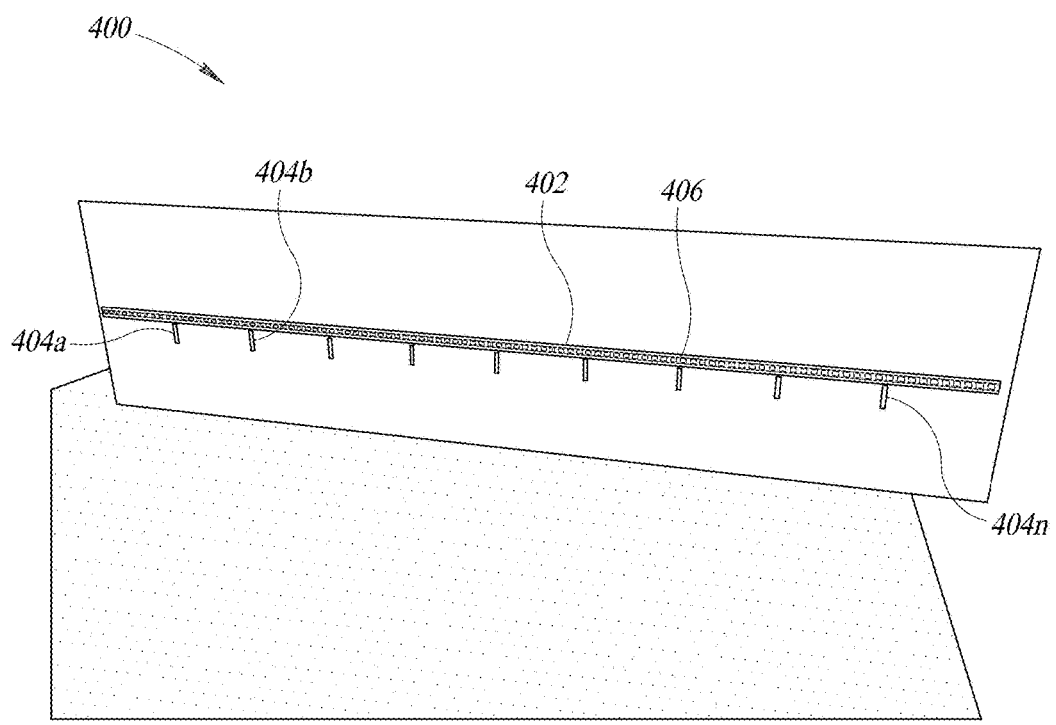
FIG. 4 is an isometric view of a calibration template which can be used to calibrate the system of FIG. 1, according to at least one illustrated implementation.

FIG. 4 is an isometric view of a calibration template 400 which can be used to calibrate the system of FIG. 1 at each of a plurality of ranges or distances, according to at least one illustrated embodiment.

The calibration template 400 may, for example, include an elongated line 402 that extends in first direction (e.g., horizontally in FIG. 4), with a plurality of shorter lines 404a, 404b, . . . 404n (only three called out, collectively 404) that extend laterally (e.g., vertically in FIG. 4) from the elongated line 402 at a defined spacing. The calibration template 400 may optionally include a scale (e.g., set of demarcations with respective values spaced at defined intervals) 406 that extend along the elongated line 402.

Figure 5:
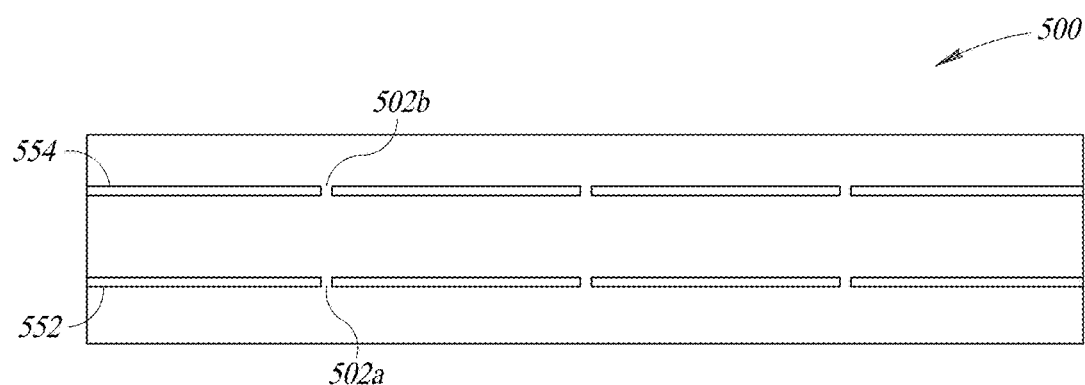
FIG. 5 is an image of instances of a structured light pattern (e.g., laser scan lines) returned from the calibration template of FIG. 4, according to at least one illustrated implementation.

FIG. 5 is a calibration image 500 of structured light patterns in the form of lines 552, 554 of light returned from the calibration template 400 of FIG. 4, according to at least one illustrated embodiment.

As visible in FIG. 5, each of the lines 552, 554 includes a number of gaps (e.g., black vertical bar or stripe) 502a, 502b (only two called out) which results from the light (e.g., laser) beam passing across of the shorter lines 404 (FIG. 4) of the calibration target. The centers of these gaps 502a, 502b are determined to calibrate for the width W of an object (i.e., dimension along a Y-axis).

Figure 6:
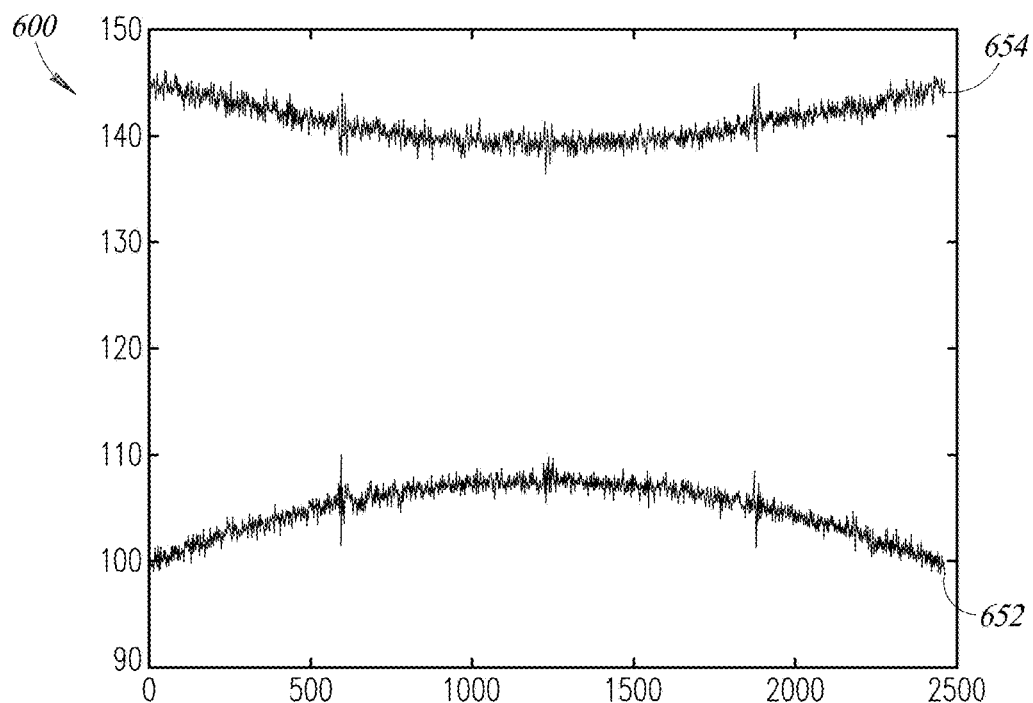
FIG. 6 is a graph of a calibration image after locating a center of a structured light pattern (e.g., laser line), according to at least one illustrated implementation, a curvature caused by lens distortion.

FIG. 6 is a graph 600 of the calibration image 500 (FIG. 5) after locating a center of the lines 552, 554, according to at least one illustrated embodiment.

The graph 600 includes first and second plots 652, 654, corresponding to lines 552, 554, respectively, of the calibration image 500. In particular, an intensity of each of the lines 552, 554 is plotted for various positions (e.g., pixels) along a horizontal axis of the graph 600. A curvature in the plots 652, 654 is caused by lens distortion and is not otherwise indicative of a dimension (e.g., range R, width W) related to an object (e.g., calibration template 400).

The system is calibrated for "Y" and "Z" by finding a centroid of each of lines 552, 554 (e.g., laser line) imaged using a target (e.g., calibration template 400 of FIG. 4) positioned at known ranges. For this calibration, an overdetermined system of equations was solved using a least squares (MATLAB "\") approach, to generate the calibration factors for dimensions along both the Z-axis and the Y-axis. A third order system was found to give reasonable results.

Figure 7:
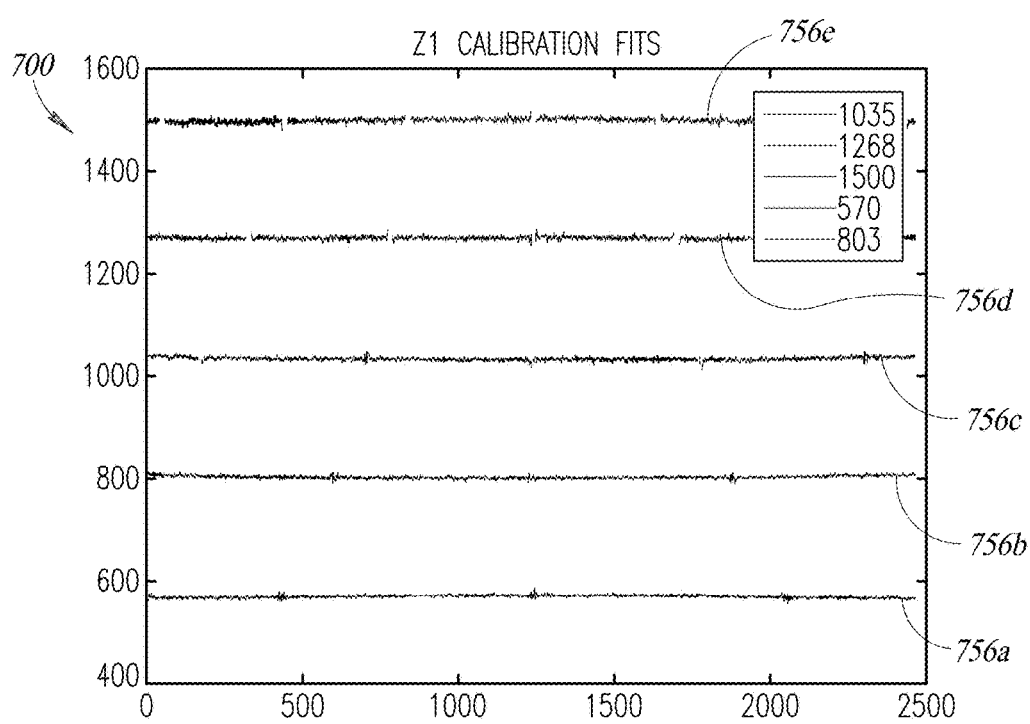
FIG. 7 is a graph of range calibrated at five distances, according to at least one illustrated implementation.

FIG. 7 is a graph 700 of range R calibrations at five distances or ranges R to the calibration template 400, according to at least one illustrated embodiment.

In particular, the graph 700 shows a first calibration fit 756a at a range of 570 mm, a second calibration fit 756b at a range of 803 mm, a third calibration fit 756c at a range of 1035 mm, a fourth calibration fit 756d at a range of 1268 mm, and a fifth calibration fit 756e at a range of 1500 mm.

Figure 8:
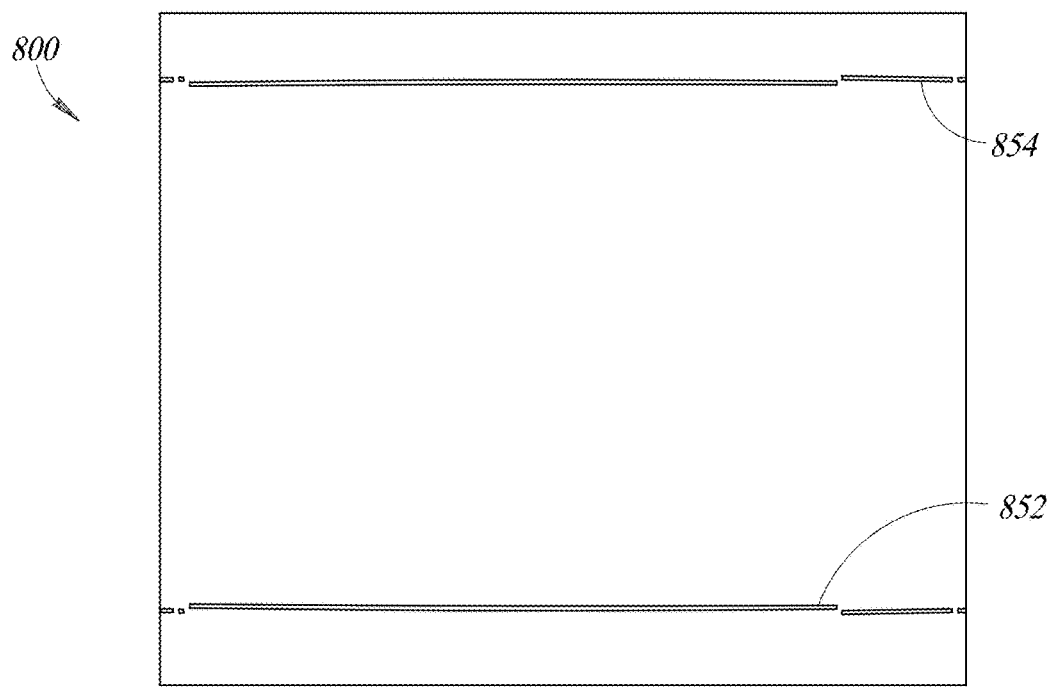
FIG. 8 is an image of two instances of a structured light pattern (e.g., laser line) captured by the light sensor of FIG. 1 after being returned from an object and reflection by the two angled reflectors, according to at least one illustrated implementation.

FIG. 8 is an image 800 of two instances of a structured light pattern (e.g., laser line) in the form of lines 852, 854 captured by the light sensor 110 of FIG. 1, after being returned from an object 104 (FIG. 1) and reflection by the two angled reflectors 112a, 112b (FIGS. 1, 2), according to at least one illustrated embodiment. In this instance, the object 104 is a single wood box with dimensions of 152.2 mm by 457.1 mm by 304.6 mm.

Figure 9:
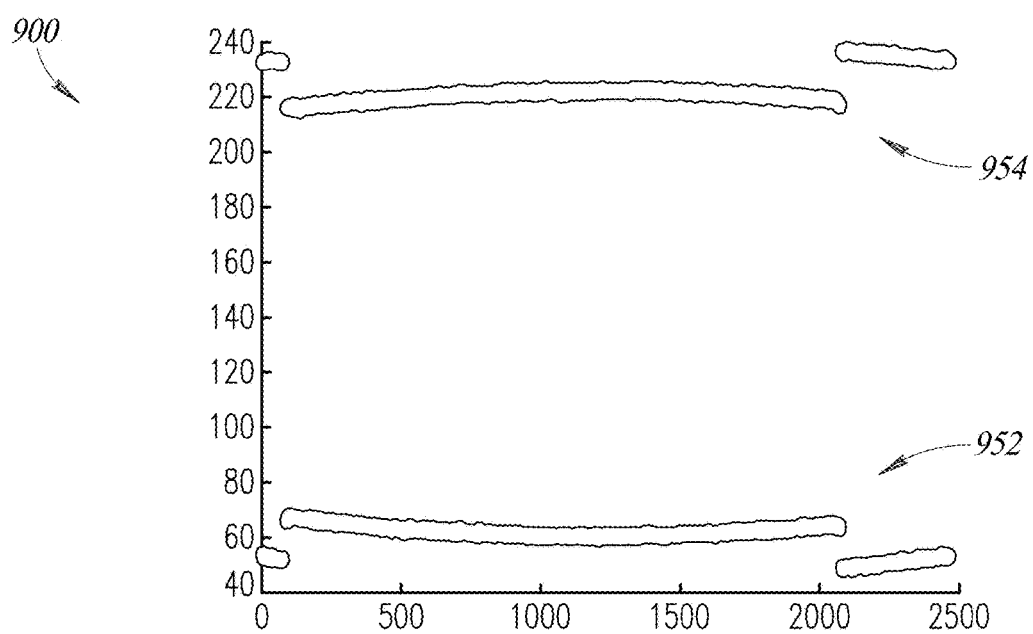
FIG. 9 is a graph showing a result of finding the centroid of the two instances of the structured light pattern (e.g., laser lines) of FIG. 8 detected by the light sensor, according to at least one illustrated implementation.

FIG. 9 is a graph 900 showing a result of finding the centroid of the two instances of the structured light pattern in the form of lines 852, 854 of FIG. 8 detected by the light sensor 110 (FIG. 1), according to at least one illustrated embodiment.

The graph 900 includes first and second plots 952, 954, corresponding to lines 852, 854, respectively, of the image 800. In particular, an intensity of each of the lines 552, 554 is plotted for various positions (e.g., pixels) along a horizontal axis of the graph 600. A slight curvature in the plots 952, 954 is caused by lens distortion and is not otherwise indicative of a dimension (e.g., range R, width W) related to an object (e.g., calibration template 400).

Figure 10:
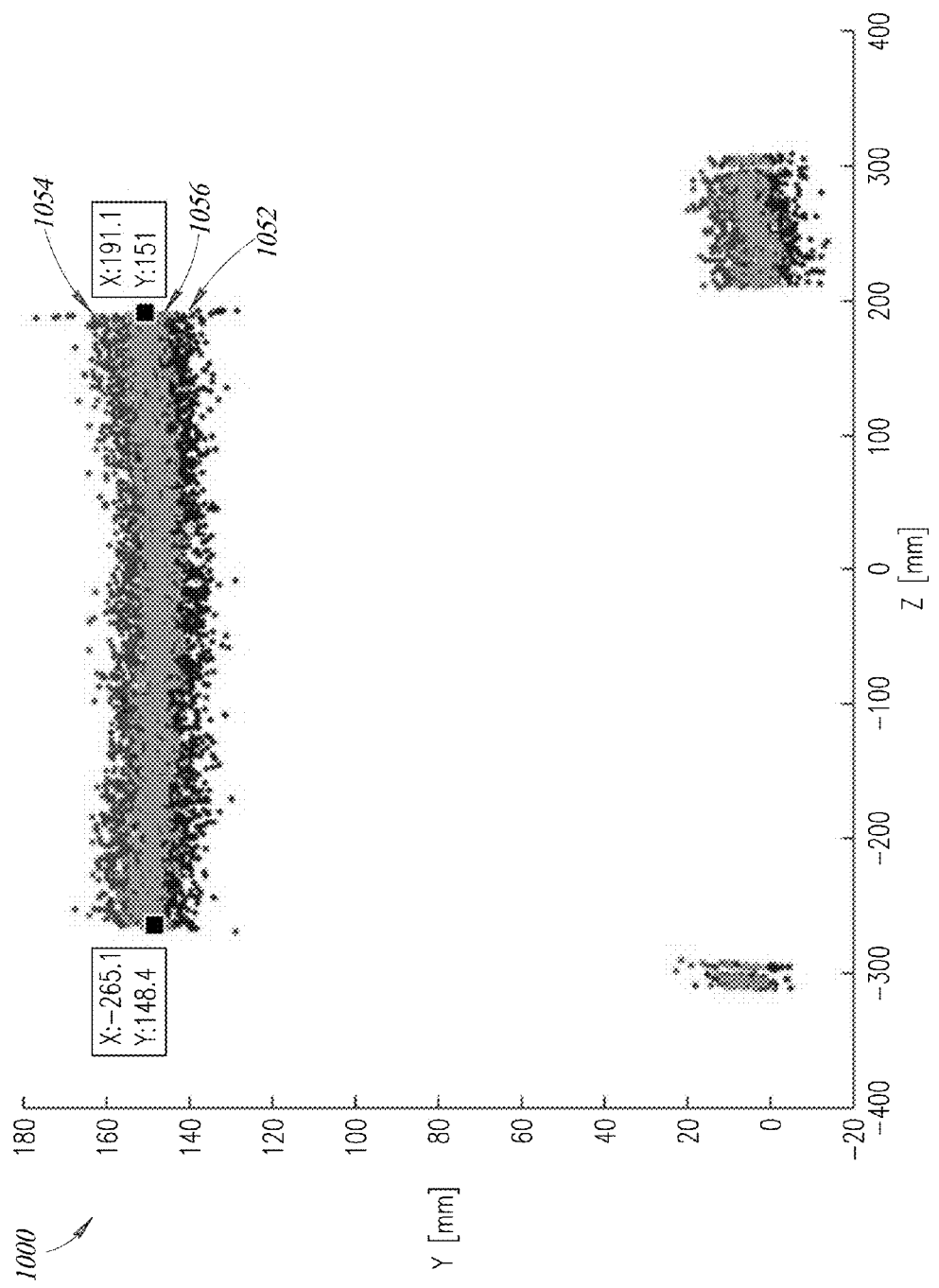
FIG. 10 is a graph of calibrated results from analysis of the result of finding the centroid of the two instances of the structured light pattern (e.g., laser lines) of FIG. 8, according to at least one illustrated implementation.

FIG. 10 is a graph 1000 of calibrated results from two instances of a structure light pattern in the form of lines (e.g., laser lines) 852, 854 (FIG. 8), according to at least one illustrated embodiment.

A set of blue points 1052 and red points 1054 are the calibrated results from a bottom line 852 and a top line 854, respectively. A set of green points 1056 are an average of the blue and red points 1052, 1054. As can be seen from the graph 1000, the results in the range R or height H (along the Z-axis) and the width W (along the Y-axis) are reasonable. The object in this instance is a box with actual dimensions of 152 mm tall and 457 mm wide. The graph 1000 shows some slight offset between blue points and the red points, which may be the result of a change to the parallax angle in between calibration and run-time when the image of the object (e.g., box) was captured. There is also some error at the corners associated with a height of a belt which carried the object and associated with curvature seen in the object. It may be possible to reduce or even eliminate such error via more refined calibration.

Figure 11:
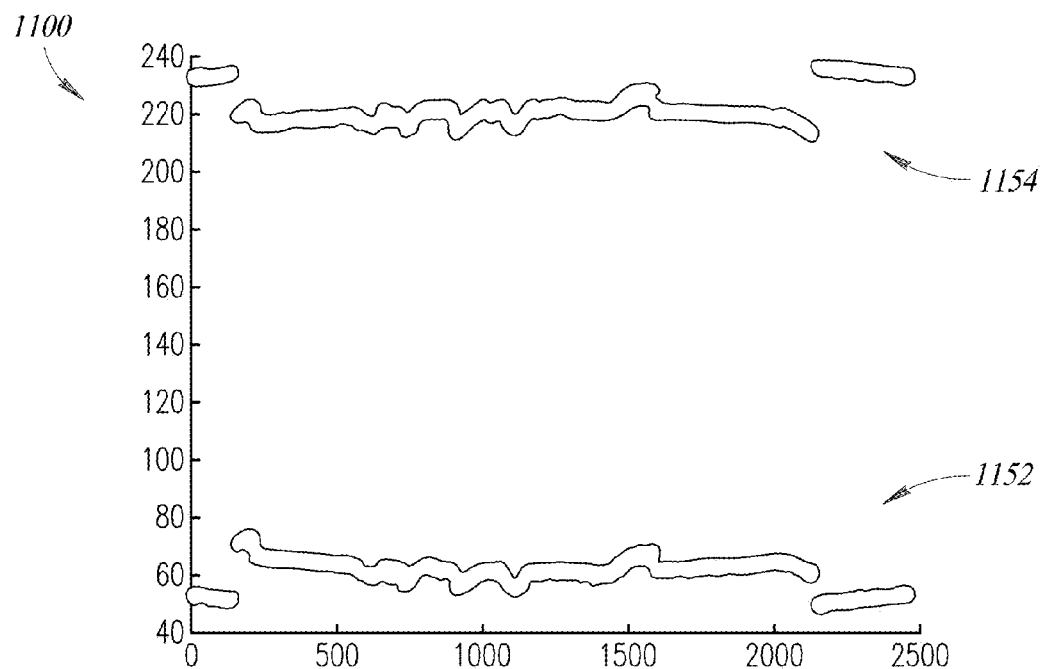
FIG. 11 is a graph of results from analysis of the result of finding the center of the two instances of the structured light pattern (e.g., laser lines) of FIG. 8, according to at least one illustrated implementation.

FIG. 11 is a graph 1100 of showing a result of finding a centroid of the two instances of a structure light pattern in the form of lines (e.g., laser scan) 1152, 1154 detected by a light sensor (e.g., light sensor 110 of FIG. 1) returned from a box which has a significant variation in reflectance across a surface thereof, according to at least one illustrated embodiment.

An object, for example a box, that has significant variation in reflectance typically results in significant error in finding a laser centroid, and hence results in error in determined dimensions (e.g., range, distance, height, width). The variation in reflectance can be caused by a variety of factors, for example printing (e.g., text, graphics), tape or other film, and/or dirt or debris on the surface being scanned. The magnitude of the problem is proportional to a width of the laser line or stripe. Relatively more narrow laser lines or stripes are of course more immune to this problem, however it is difficult to implement a narrow stripe over a large working range.

Figure 12:
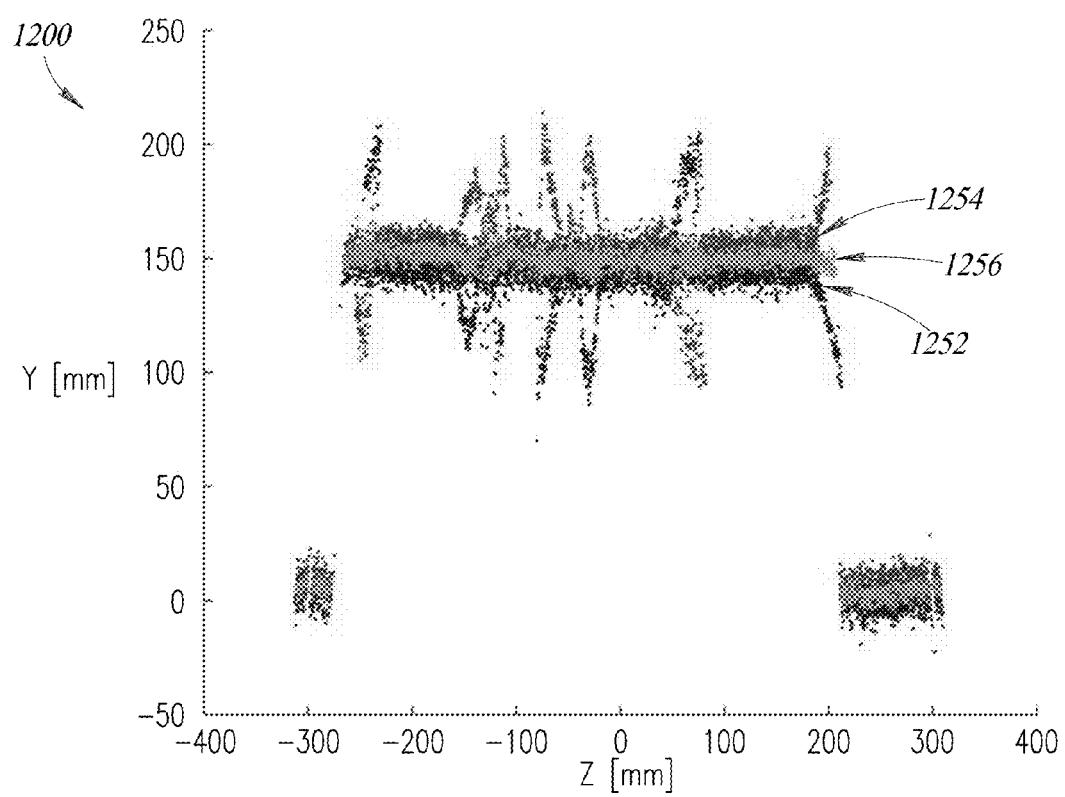
FIG. 12 is a graph that demonstrates that the "differential" approach taught herein advantageously inherently cause errors to cancel out, according to at least one illustrated implementation.

FIG. 12 is a graph 1200 of calibrated results from two instances of a structure light pattern in the form of lines (e.g., laser lines) 1152, 1154 (FIG. 11), according to at least one illustrated embodiment.

A set of blue points 1252 and red points 1254 are the calibrated results from a bottom line 1152 and a top line 1154, respectively. A set of green points 1256 are an average of the blue and red points 1252, 1254. As can be seen from the graph 1200, the "differential" approach taught herein advantageously inherently causes errors to cancel out.

Figure 13:
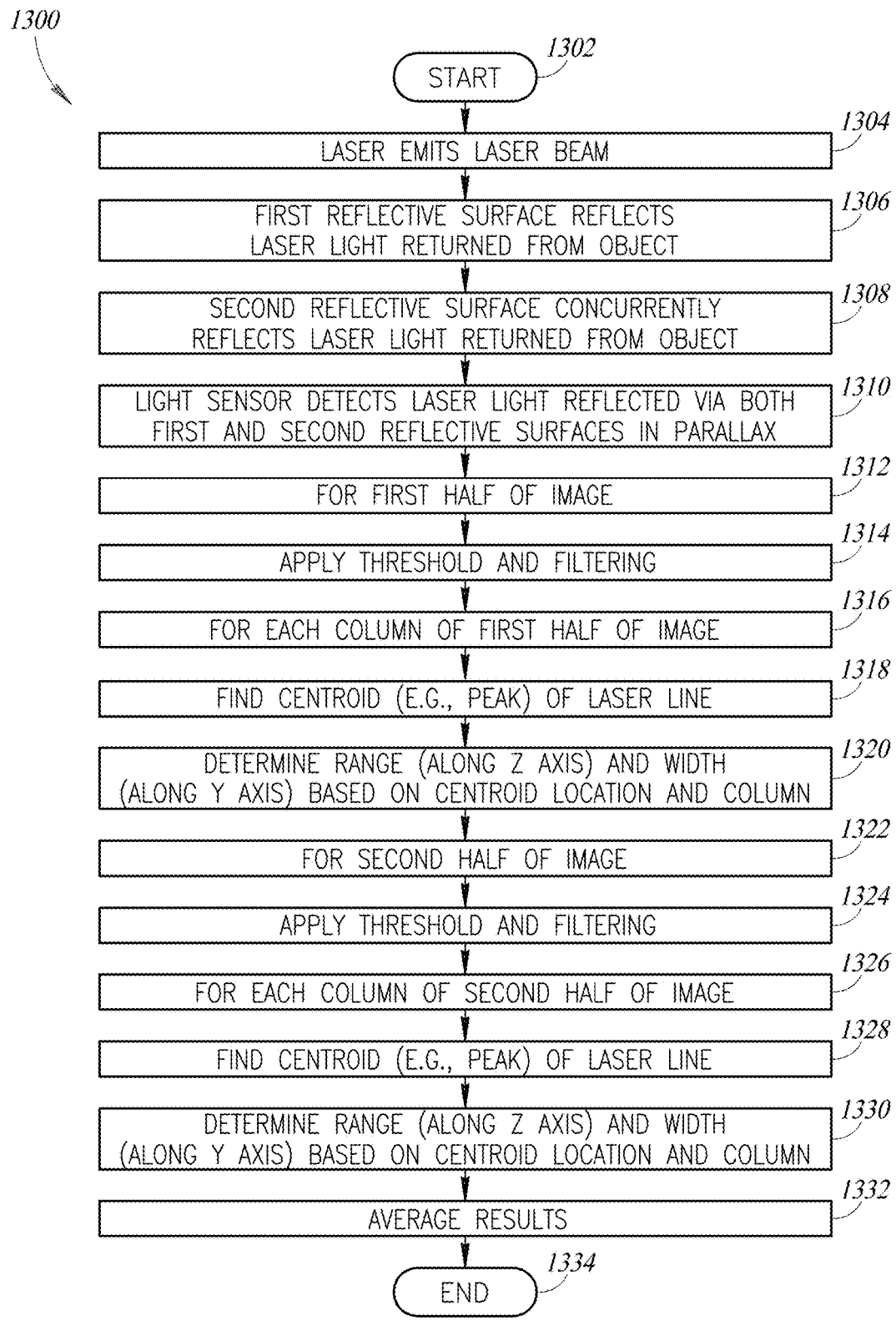
FIG. 13 is a flow diagram showing a method of operating a system to determine at least one dimension (e.g., range, height, width, length) associated with an object, according to at least one illustrated implementation.

FIG. 13 is a flowchart diagram showing a method 1300 of operating a system to determine dimensions associated with an object, according to at least one illustrated embodiment. The method 1300 can be executed by the system generally described herein. The method 1300 can include additional acts, may omit some acts, and/or may perform one or more acts in a different order than the order set out in FIG. 13.

At 1302, the method 1300 starts for example on starting up or powering of a system or device, or in response to a user input or invocation by a calling routine, program, function call or subprogram.

At 1304, a light source (e.g., laser, LEDs) emits a light beam. The light may be emitted as a structured light pattern or may be reflected or diffracted as a structure light pattern.

At 1306, a first reflective surface reflects light returned from an object in an environment. At 1308, the second reflective surface, oriented at a non-zero angle with respect to the first reflective surface, concurrently reflects light returned from an object in the environment. At 1310, a light sensor (e.g., a linear image sensor) detects the light reflected from the object in the environment via both the first and the second reflective surfaces in parallax.

At 1312, a first half of an image captured by the light sensor is processed via circuitry, for example a lower half of the image containing the image of one instance of the structured light pattern (e.g., laser line) reflected by one of the reflective portions or reflectors.

At 1314, the circuitry applies a threshold and one or more filters to the first half of the image, for example to clean up and isolate the image of the instance of the structured light pattern (e.g., laser line or stripe) in the first half of the image. For example, the circuitry may apply a brightness threshold and/or a moving average filter or low pass filter to the image data.

At 1316, each column of pixels is processed, for example successively column by column. Each column extends in a direction in the image that is parallel to the X-axis, and columns are successively encountered along a direction in the image that is parallel with the Y-axis. For the respective column, the circuitry finds the centroid (e.g., peak, center along axis of column or thickness of line) of the structured light pattern (e.g., laser line) at 1318. For the respective column, the circuitry determines a range (z) and width distance across the belt (y) based on centroid location and column at 1320. For example, the circuitry may look up (e.g., in look-up table) the corresponding range R and/or width W or calculate (e.g., solve defined equation(s)) range R and/or width W.

At 1322, a second half of the image captured by the light sensor is processed via circuitry, for example an upper half of the image containing the image of one instance of the structured light pattern (e.g., laser line) reflected by one of the reflective portions or reflectors.

At 1324, the circuitry applies a threshold and one or more filters to the second half of the image, for example to clean up and isolate the image of the instance of the structured light pattern (e.g., laser line or stripe) in the second half of the image.

At 1326, each column of pixels is processed, for example successively column by column. For the respective column, the circuitry finds the centroid (e.g., peak, center along axis of column or thickness of line) of the structured light pattern (e.g., laser line) at 1328. For the respective column, the circuitry determines a range (z) and width distance across the belt (y) based on centroid location and column at 1330. For example, the circuitry may look up the corresponding range R and/or width W or calculate range R and/or width W.

At 1332, the circuitry averages the results from the processing of the first and the second halves of the image.

The method 1300 terminates at 1334, for example until invoked again. Alternatively, the method 1300 may repeat continually, for instance periodically. In some implementations, the method 1300 may be executed as a thread on a multi-threaded processor.

Various embodiments of the apparatus, devices and/or processes via the use of block diagrams, schematics, and examples have been set forth herein. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application-Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof, and that designing the circuitry and/or writing the code for the software and/or firmware would be well within the skill of one of ordinary skill in the art in light of this disclosure.

When logic is implemented as software and stored in memory, one skilled in the art will appreciate that logic or information can be stored on any computer-readable medium for use by or in connection with any computer and/or processor related system or method. In the context of this document, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer-readable medium" can be any means that can store, communicate, propagate, or transport the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms taught herein are capable of being distributed as a program product in a variety of forms, and that an illustrative embodiment applies equally, regardless of the particular type of signal bearing media used to actually carry out the distribution. Examples of non-transitory signal bearing media include, but are not limited to, the following: recordable type media such as floppy disks, hard disk drives, CD ROMs, digital tape, and computer memory; and transitory or transmission type media such as digital and analog communication links using TDM or IP based communication links (e.g., packet links).

Those of skill in the art will recognize that many of the methods or algorithms set out herein may employ additional acts, may omit some acts, and/or may execute acts in a different order than specified. The various embodiments described above can be combined to provide further embodiments. Aspects of the embodiments can be modified, if necessary, to employ additional systems, circuits and concepts to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A system, comprising:
    a light source operable to emit light outward into an environment;
    a first reflective surface and a second reflective surface, the first and the second reflective surfaces positioned with respect to the light source to concurrently receive light returned from an object in the environment as a structured light pattern, the second reflective surface oriented at a non-zero angle with respect to the first reflective surface;
    a light sensor positioned to concurrently detect, in parallax, light reflected from the object in the environment via both the first and the second reflective surfaces, respectively as a first instance of the structured light pattern reflected from the first reflective surface and a second instance of the structured light pattern reflected from the second reflective surface; and
    at least one processor communicatively coupled to the light sensor, and which in operation correlates a relative position of the first and the second instances of the structured light pattern detected by the light sensor and determines at least one dimension related to the object based at least in part on the correlation of the relative positions of the first and the second instances of the structured light pattern detected by the light sensor, wherein to correlate a relative position of the first and the second instances of the structured light pattern detected by the light sensor, the at least one processor:
    for the first instance of the structured light pattern, determines at each of a plurality of positions along the first instance of the structured light pattern a respective centroid for the first instance of the structured light pattern at the respective position; and
    for the second instance of the structured light pattern, determines at each of a plurality of positions along the second instance of the structured light pattern a respective centroid for the second instance of the structured light pattern at the respective position.

2. The system of claim 1 wherein the non-zero angle between the first and the second reflective surfaces is an obtuse angle that is less than 180 degrees.

3. The system of claim 1 wherein the first reflective surface is a planar surface that has a respective inner edge and the second reflective surface is a planar surface that has a respective inner edge, the second reflective surface spaced from the first reflective surface with a gap between the respective inner edges of the first and the second reflective surfaces, and the light passes through the gap outward into the environment.

4. The system of claim 1 wherein the first reflective surface is a portion of a first mirror and the second reflective surface is a portion of a second mirror, the second mirror separate and distinct from the first mirror.

5. The system of claim 1 wherein the first reflective surface is a first portion of a mirror and the second reflective surface is a second portion of the mirror.

6. The system of claim 1 wherein the light sensor is a single two-dimensional light sensor, and further comprising:
    at least one mirror positioned with respect to the light source and operable to at least one of rotate or pivot to produce the structured light pattern.

7. The system of claim 1 wherein the light sensor is a two-dimensional image sensor, and further comprising:
    a conveyor that carries the object past a field of view of the two-dimensional image sensor via the first and the second reflective surfaces.

8. The system of claim 1 wherein the at least one dimension related to the object determined by the at least one processor includes a distance to a surface of the object.

9. The system of claim 8 wherein the at least one dimension related to the object determined by the at least one processor includes a height of the object.

10. The system of claim 9 wherein the at least one dimension related to the object determined by the at least one processor includes at least one of a width of the object or a length of the object.

11. The system of claim 1 wherein to determine at least one dimension related to the object based at least in part on the correlation of the relative positions of the first and the second instances of the structured light pattern, the at least one processor:
    determines a range to the object based on the determined centroids along the first and the second instances of the structured light pattern.

12. The system of claim 11 wherein the at least one processor determines the range to the object based at least in part on the determined centroids for each of the positions along the first and the second instances of the structured light pattern.

13. The system of claim 11 wherein the at least one processor determines the range to the object further based on a set of calibration information.

14. The system of claim 11 wherein the at least one processor averages the results of the determined range to the object based on the determined centroids for each of the positions along the first and the second instances of the structured light pattern.

15. The system of claim 11 wherein to determine at least one dimension related to the object based at least in part on the correlation of the relative positions of the first and the second instances of the structured light pattern, the at least one processor:
  determines a height of the object based on the determined range and a distance to a surface on which the object is supported.

16. The system of claim 11 wherein to determine at least one dimension related to the object based at least in part on the correlation of the relative positions of the first and the second instances of the structured light pattern, the at least one processor:
  determines a width of the object based on the determined centroids.

17. The system of claim 16 wherein the at least one processor determines a width of the object based at least in part on the determined centroids for each of the positions along the first and the second instances of the structured light pattern.

18. The system of claim 17 wherein the at least one processor averages the results of the determined width of the object based on the determined centroids for each of the positions along the first and the second instances of the structured light pattern.

19. The system of claim 16 wherein the at least one processor determines the width of the object further based on a set of calibration information.

20. The system of claim 16 wherein the light source is a laser, the structure light is a linear pattern of laser light, and further comprising:
  a lens and a bandpass filter in an optical path of the light sensor.

21. The system of claim 1, wherein the structured light pattern includes at least one of a laser line, a scan line, a line of dots, a line of spots, a laser stripe, or multiple lines.

22. A method, comprising:
  emitting a light beam by a light source;
  reflecting light returned from an object in an environment by a first reflective surface;
  concurrently reflecting the light returned from the object in the environment by a second reflective surface, the second reflective surface oriented at a non-zero angle with respect to the first reflective surface;
  detecting by a light sensor the light reflected from the object in the environment via both the first and the second reflective surfaces in parallax, respectively as a first instance of a structured light pattern reflected from the first reflective surface and a second instance of the structured light pattern reflected from the second reflective surface; and
  determining by at least one processor communicatively coupled to the light sensor, at least one dimension related to the object based at least in part on a correlation of a relative position of the first and the second instances of the structure light pattern detected by the light sensor including:
    for the first instance of the structured light pattern, determining at each of a plurality of positions along the first instance of the structured light pattern a respective centroid for the first instance of the structured light pattern at the respective position; and
    for the second instance of the laser line, determining at each of a plurality of positions along the second instance of the structured light pattern a respective centroid for the second instance of the structured light pattern at the respective position.

23. The method of claim 22 wherein emitting a light beam by a light source, outward into an environment includes passing the light beam through a gap between respective inner edges of the first and the second reflective surfaces.

24. The method of claim 22, further comprising:
  rotating or pivoting at least one mirror to reflect light emitted by the light source as the linear pattern.

25. The method of claim 22 wherein the light sensor is a two-dimensional image sensor, and further comprising:
  transporting the object by a conveyor past a field of view of the two-dimensional image sensor.

26. The method of claim 22 wherein determining at least one dimension related to the object based at least in part on a correlation of a relative position of the first and the second instances of the structured light pattern detected by the light sensor includes determining a distance to a portion of the object by the at least one processor.

27. The method of claim 26 wherein determining at least one dimension related to the object based at least in part on a correlation of a relative position of the first and the second instances of the structured light pattern detected by the light sensor includes determining a height of the object by the at least one processor.

28. The method of claim 27 wherein determining at least one dimension related to the object based at least in part on a correlation of a relative position of the first and the second instances of the structured light pattern detected by the light sensor includes determining at least one of a width of the object or a length of the object by the at least one processor.

29. The method of claim 22 wherein determining at least one dimension related to the object based at least in part on the correlation of the relative positions of the first and the second instances of the structured light pattern, includes:
  determining a range to the object based on the determined centroids along the first and the second instances of the structured light pattern.

30. The method of claim 29 wherein determining the range to the object based at least in part on the determined centroids includes determining the range for each of the positions along the first and the second instances of the structured light pattern.

31. The method of claim 29 wherein determining the range to the object based at least in part on the determined centroids includes determining the range to the object further based on a set of calibration information.

32. The method of claim 29 wherein determining at least one dimension related to the object based at least in part on a correlation of a relative position of the first and the second instances of the structured light pattern detected by the light sensor further includes averaging the results of the determined range to the object based on the determined centroids for each of the positions along the first and the second instances of the structured light pattern.

33. The method of claim 29 wherein determining at least one dimension related to the object based at least in part on the correlation of the relative positions of the first and the second instances of the structured light pattern, includes:
    determining a height of the object based on the determined range and a distance to a surface on which the object is supported.

34. The method of claim 33 wherein determining at least one dimension related to the object based at least in part on the correlation of the relative positions of the first and the second instances of the structured light pattern, includes:
    determining at least one of a width of the object or a length of the object based on the determined centroids.

35. The method of claim 34 wherein determining a width of the object based at least in part on the determined centroids includes, for each of the positions along the first and the second instances of the structured light pattern, determining the width of the object based at least in part on respective ones of the determined centroids.

36. The method of claim 35 wherein determining at least one dimension related to the object based at least in part on a correlation of a relative position of the first and the second instances of the structured light pattern detected by the light sensor further includes averaging the results of the determined width of the object based on the determined centroids for each of the positions along the first and the second instances of the structured light pattern.

37. The method of claim 34 wherein determining a width of the object based at least in part on the determined centroids includes determining the width of the object further based on a set of calibration information.

38. A system, comprising:
    a light source operable to emit light outward into an environment;
    a first reflective surface and a second reflective surface oriented relative to each other at a non-zero angle, and positioned with respect to the light source to concurrently receive light returned from an object in the environment as a structured light pattern;
    a light sensor positioned to concurrently detect, in parallax, light reflected from the object in the environment via both the first reflective surface and the second reflective surface, respectively as a first instance of the structured light pattern reflected from the first reflective surface and a second instance of the structured light pattern reflected from the second reflective surface; and
    at least one processor communicatively coupled to the light sensor, and configured to:
    correlate a relative position of the first instance of the structured light pattern and the second instance of the structured light pattern by determining at each of a plurality of positions along the first instance of the structured light pattern a respective centroid for the first instance of the structured light pattern at the respective position, and determining at each of a plurality of positions along the second instance of the structured light pattern a respective centroid for the second instance of the structured light pattern at the respective position; and
    determine at least one dimension related to the object based at least in part on the correlation of the relative positions of the first and the second instances of the structured light pattern detected by the light sensor.

* * * * *